(12) United States Patent
Kim et al.

(10) Patent No.: US 9,323,384 B2
(45) Date of Patent: Apr. 26, 2016

(54) TOUCH SENSOR SUBSTRATE AND DISPLAY APPARATUS HAVING THE TOUCH SENSOR SUBSTRATE

(71) Applicant: Samsung Display Co., LTD., Yongin, Gyeonggi-Do (KR)

(72) Inventors: In-Cheol Kim, Yongin (KR); Il-Ho Lee, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/327,158

(22) Filed: Jul. 9, 2014

(65) Prior Publication Data

US 2015/0227254 A1 Aug. 13, 2015

(30) Foreign Application Priority Data

Feb. 10, 2014 (KR) ........................ 10-2014-0015030

(51) Int. Cl.
*G06F 3/045* (2006.01)
*G06F 3/046* (2006.01)
*G06F 3/041* (2006.01)
*G06F 3/044* (2006.01)

(52) U.S. Cl.
CPC .............. *G06F 3/0416* (2013.01); *G06F 3/044* (2013.01); *G06F 3/046* (2013.01); *G06F 3/0412* (2013.01); *G06F 2203/04106* (2013.01)

(58) Field of Classification Search
CPC ....................................................... G06F 3/046
USPC ................................ 345/173, 174; 178/18.07
See application file for complete search history.

(56) References Cited

U.S. PATENT DOCUMENTS

| | | | | |
|---|---|---|---|---|
| 2009/0160790 | A1* | 6/2009 | Fukushima et al. | 345/173 |
| 2009/0166100 | A1* | 7/2009 | Matsubara | 178/18.06 |
| 2009/0267905 | A1* | 10/2009 | Hsu et al. | 345/173 |
| 2010/0245283 | A1 | 9/2010 | Lee et al. | |
| 2010/0328249 | A1 | 12/2010 | Ningrat et al. | |
| 2011/0068776 | A1* | 3/2011 | Yokota et al. | 324/686 |
| 2011/0069022 | A1* | 3/2011 | Yokota et al. | 345/173 |
| 2011/0216030 | A1 | 9/2011 | Lee | |
| 2011/0216032 | A1* | 9/2011 | Oda et al. | 345/174 |
| 2011/0227588 | A1* | 9/2011 | Chen et al. | 324/658 |
| 2011/0227869 | A1* | 9/2011 | Lai et al. | 345/174 |
| 2011/0298748 | A1* | 12/2011 | Chen et al. | 345/174 |
| 2013/0155005 | A1* | 6/2013 | Liang | 345/174 |
| 2013/0155006 | A1* | 6/2013 | Li et al. | 345/174 |
| 2013/0181937 | A1* | 7/2013 | Chen et al. | 345/174 |
| 2014/0002413 | A1* | 1/2014 | Kim | 345/174 |

FOREIGN PATENT DOCUMENTS

| | | |
|---|---|---|
| JP | 2008-152640 | 7/2008 |
| JP | 2012-160055 | 8/2012 |
| KR | 101027672 B1 | 4/2011 |
| KR | 10-2013-0060466 | 6/2013 |
| KR | 10-2014-0035789 A | 3/2014 |

\* cited by examiner

*Primary Examiner* — Adam J Snyder
(74) *Attorney, Agent, or Firm* — Innovation Counsel LLP

(57) ABSTRACT

A touch sensor substrate includes a base substrate, a first touch sensor part that is disposed on the base substrate and includes a plurality of sensing circuits configured to sense a touch in an electromagnetic induction mode and a second touch sensor part that is disposed on the base substrate, is electrically insulated to the first touch sensor part, and comprises a plurality of sensing electrodes configured to sense a touch in a self capacitance mode.

20 Claims, 7 Drawing Sheets

TOUCH SENSOR SUBSTRATE AND DISPLAY APPARATUS HAVING THE TOUCH SENSOR SUBSTRATE

This application claims priority from and the benefit of Korean Patent Application No. 10-2014-0015030 filed on Feb. 10, 2014, which is hereby incorporated by reference for all purposes as if fully set forth herein.

BACKGROUND OF THE INVENTION

1. Field of the Invention

Exemplary embodiments of the present inventive concept relate to a method of driving a touch sensor substrate and a display apparatus having the touch sensor substrate. More particularly, example embodiments of the present inventive concept relate to a touch sensor substrate for simplifying processes and a display apparatus having the touch sensor substrate.

2. Description of the Related Art

Generally, a liquid crystal display apparatus includes a liquid crystal display panel which displays an image using light transmittance of the liquid crystal and a backlight assembly which is disposed under the liquid crystal display panel and provides the liquid crystal display panel with light.

The liquid crystal display apparatus includes the liquid crystal display panel, a gate driver circuit and a data driver circuit. The liquid crystal display panel includes a plurality of gate lines, a plurality of data lines and a plurality of pixels. The gate driver circuit provides the gate lines with a gate signal. The data driver circuit provides the data line with a data signal. Each of the pixels includes a pixel electrode and a thin film transistor. The thin film transistor is connected to the data line, the gate line and the pixel electrode and drives the pixel electrode.

Recently, a touch sensing display apparatus has developed. The touch sensing display apparatus includes a touch sensor module having a touch sensor and a liquid crystal display panel combined with each other such that a touch may be sensed and an image may be displayed. A sensing type of the touch sensor may be divided into a resistive type, a capacitance type, an electromagnetic induction type and so on.

BRIEF SUMMARY OF THE INVENTION

Exemplary embodiments of the present inventive concept provide a touch sensor substrate for simplifying processes.

Exemplary embodiments of the present inventive concept provide a display apparatus having the touch sensor substrate.

According to an exemplary embodiment of the inventive concept, there is provided a touch sensor substrate. The touch sensor substrate includes a base substrate, a first touch sensor part which is disposed on the base substrate and comprises a plurality of sensing circuits configured to sense a touch in an electromagnetic induction mode and a second touch sensor part which is disposed on the base substrate, is electrically insulated from the first touch sensor part, and comprising a plurality of sensing electrodes configured to sense a touch in a self capacitance mode.

In an exemplary embodiment, the second touch sensor part may further include a plurality of signal lines connected to the sensing electrodes.

In an exemplary embodiment, the first touch sensor part may include a first sensing circuit which extends in a first direction and a second sensing circuit which extend in a second direction crossing the first direction, wherein each of the first and second sensing circuits may have a closed-loop structure.

In an exemplary embodiment, the first sensing circuit may overlap with the sensing electrodes which are arranged in the first direction, and the second sensing circuit may overlap with the sensing electrodes which are arranged in the second direction.

In an exemplary embodiment, each of the sensing electrodes may include a first sub electrode, a second sub electrode being spaced apart from the first sub electrode and a connection electrode connecting between the first and second sub electrodes, and the first touch sensor part is disposed in a spacing area between the first and second sub electrodes.

In an exemplary embodiment, the signal lines may extend from the sensing electrodes, respectively.

In an exemplary embodiment, the touch sensor substrate may further include an insulating layer which is disposed between the signal lines, wherein the signal lines are connected to the sensing electrodes through a plurality of contact holes formed in the insulating layer.

In an exemplary embodiment, the touch sensor substrate may further include a blocking layer which blocks a magnetic field formed by the first touch sensor part from being leaked.

In an exemplary embodiment, the blocking layer may be disposed on the base substrate and the first and second touch sensor parts are disposed on the blocking layer.

In an exemplary embodiment, the base substrate may include a first surface and a second surface opposite the first surface, the first and second touch sensor parts may be disposed on the first surface, and the blocking layer is disposed on the second surface.

According to an exemplary embodiment of the inventive concept, there is provided a display apparatus. The display apparatus includes a display panel which comprises a plurality of pixel transistors and a plurality of display elements driven by the plurality of pixel transistors, a cover member which is disposed on a first surface of the display panel configured to display an image using the plurality of display elements, a touch sensor substrate which is disposed adjacent to a second surface opposite to the first surface of the display panel, and comprises, a base substrate, a first touch sensor part which is disposed on the base substrate and comprises a plurality of sensing circuits sensing a touch in an electromagnetic induction mode, and a second touch sensor part which is disposed on the base substrate, is electrically insulated from the first touch sensor part, and comprises a plurality of sensing electrodes sensing a touch in a self capacitance mode.

In an exemplary embodiment, the second touch sensor part may further include a plurality of signal lines connected to the sensing electrodes.

In an exemplary embodiment, the first touch sensor part may include a first sensing circuit which extends in a first direction and a second sensing circuit which extend in a second direction crossing the first direction, wherein each of the first and second sensing circuits may have a closed-loop structure.

In an exemplary embodiment, the first sensing circuit may overlap with the sensing electrodes which are arranged in the first direction, and the second sensing circuit may overlap with the sensing electrodes which are arranged in the second direction.

In an exemplary embodiment, each of the sensing electrodes may include a first sub electrode, a second sub electrode being spaced apart from the first sub electrode and a connection electrode connecting between the first and second sub electrodes, and the first touch sensor part may be disposed in a spacing area between the first and second sub electrodes.

In an exemplary embodiment, the signal lines may extend from the sensing electrodes, respectively.

In an exemplary embodiment, the display apparatus may include an insulating layer which is disposed between the signal lines and the sensing electrodes, wherein the signal lines may be connected to the sensing electrodes through a plurality of contact holes formed in the insulating layer.

In an exemplary embodiment, the display apparatus may include a blocking layer which blocks a magnetic field formed by the first touch sensor part from being leaked.

In an exemplary embodiment, the blocking layer may be disposed on the base substrate, and the first and second touch sensor parts are disposed on the blocking layer.

In an exemplary embodiment, the base substrate may include a first surface and a second surface opposing the first surface, the first and second touch sensor parts may be disposed on the first surface, and the blocking layer may be disposed on the second surface.

According to the present inventive concept, a plurality of touch sensors which senses in modes different from each other may be formed on a same base substrate and thus the display apparatus may have a thin thickness. In addition, a single touch sensor substrate including the plurality of touch sensors is combined with the display panel, and thus an assembly of the display apparatus may be simplified.

BRIEF DESCRIPTION OF THE DRAWINGS

The above and other features and advantages of the present inventive concept will become more apparent by describing in detail exemplary embodiments thereof with reference to the accompanying drawings, in which.

DETAILED DESCRIPTION OF THE INVENTION

Hereinafter, the present inventive concept will be explained in detail with reference to the accompanying drawings.

Figure 1:
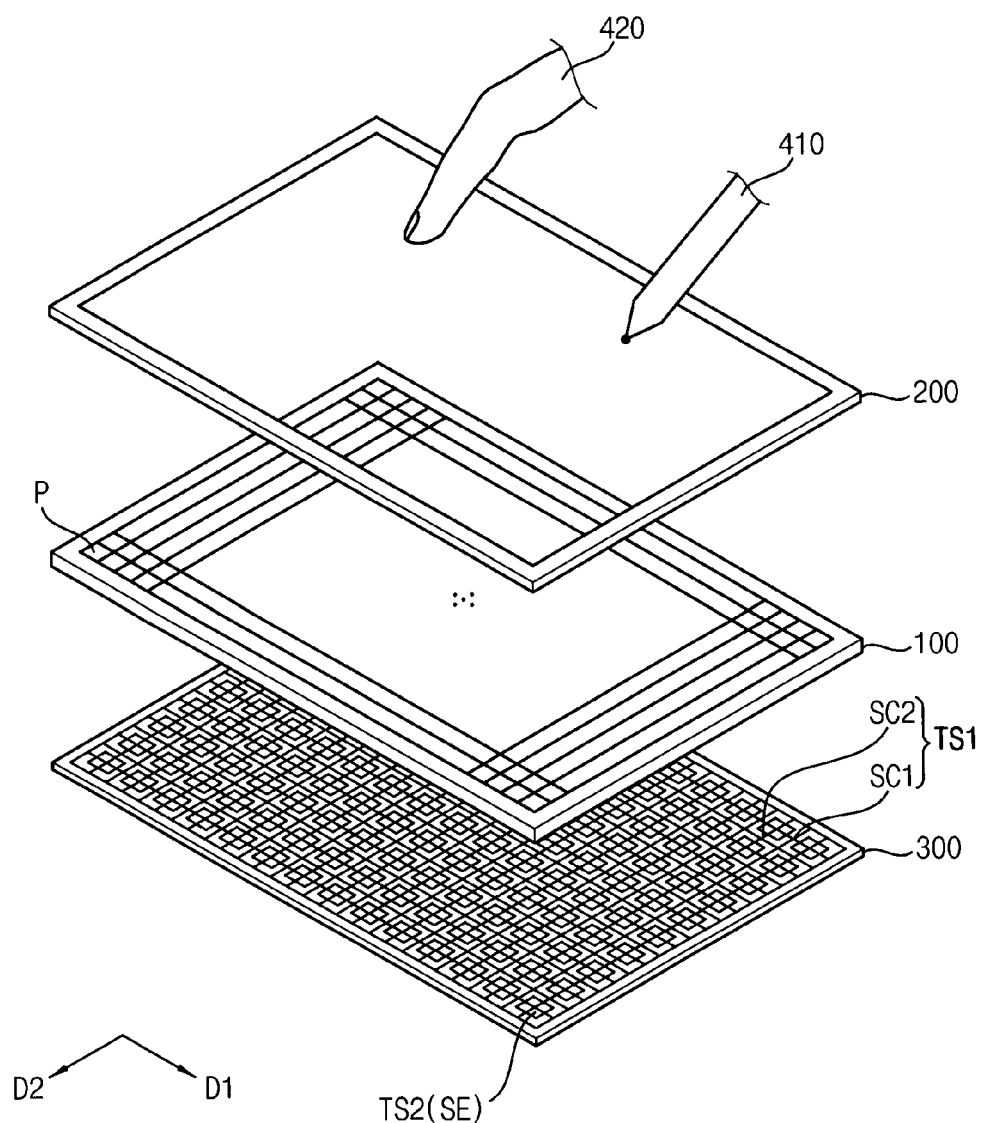
FIG. 1 is a perspective view schematically showing a display apparatus according to an exemplary embodiment.

FIG. 1 is a perspective view schematically showing a display apparatus according to an exemplary embodiment.

Referring to FIG. 1, the display apparatus may include a display panel 100, a cover member 200, a touch sensor substrate 300 and a plurality of input members 410 and 420.

The display panel 100 includes a plurality of pixels P. The pixels P are arranged as a matrix type which includes a plurality of pixel rows and a plurality of pixel columns.

Each of the pixels P includes a pixel transistor which is connected to a data line and a gate line crossing the data line and a display element which is driven by the pixel transistor. The display element may be a liquid crystal capacitor including a liquid crystal layer. Alternatively, the display element may be an organic light emitting diode ("OLED") including an organic light emitting layer.

The cover member 200 is disposed on a first surface (front surface) of the display panel 100 and covers the first surface of the display panel 100 which displays an image. The cover member 200 protects the first surface of the display panel 100 and includes a transparent tempered glass which may transmit an image displayed on the first surface of the display panel 100.

The touch sensor substrate 300 overlaps with the display panel 100 and is disposed adjacent to a second surface (rear surface) of the display panel 100 opposite to the front surface. The touch sensor substrate 300 may include a flexible circuit board.

The touch sensor substrate 300 includes a plurality of touch sensors that have touch sensing modes different from each other. For example, the touch sensor substrate 300 includes a first touch sensor part TS1 sensing in a first touch sensing mode and a second touch sensor part TS2 sensing in a second touch sensing mode.

The first touch sensor part TS1 senses a touch in an electromagnetic induction mode. The first touch sensor part TS1 includes a plurality of first sensing circuits SC1 and a plurality of second sensing circuits SC2. Each of the first sensing circuits SC1 has a closed-loop structure. The first sensing circuits SC1 extend in a first direction D1 and are arranged in a second direction D2 crossing the first direction D1. The second sensing circuits SC2 extend in the second direction D2 and are arranged in the first direction D1. Each of the second sensing circuits SC2 has a closed-loop configuration.

The second touch sensor part TS2 senses a touch in a capacitance mode. The capacitance mode may include a mutual capacitance mode which senses a change of the capacitance between two electrodes and a self capacitance mode which senses a change of a self capacitance. The second touch sensor part TS2 includes a plurality of sensing electrodes SE which is arranged in the first direction D1 and the second direction D2 in a matrix configuration. In an exemplary embodiment, each of the sensing electrodes SE senses the touch in the self capacitance mode.

Different types of input members may touch a surface of the cover member 200 corresponding to the front surface of the display panel 100. The input members may be a first input member 410 that includes a resonance circuit and/or a second input member 420 that includes a conductive material. The first input member 410 may be a touch pen and the second input member 420 may be a finger. Only one type of input member may be used at a time. However, both types of input members may be used simultaneously.

In an exemplary embodiment, the touch sensor substrate 300 includes a plurality of touch sensors TS1 and TS2 which senses in different modes. This configuration allows the display apparatus including the touch sensor substrate 300 to be thin by simplifying the assembly.

Figure 2:
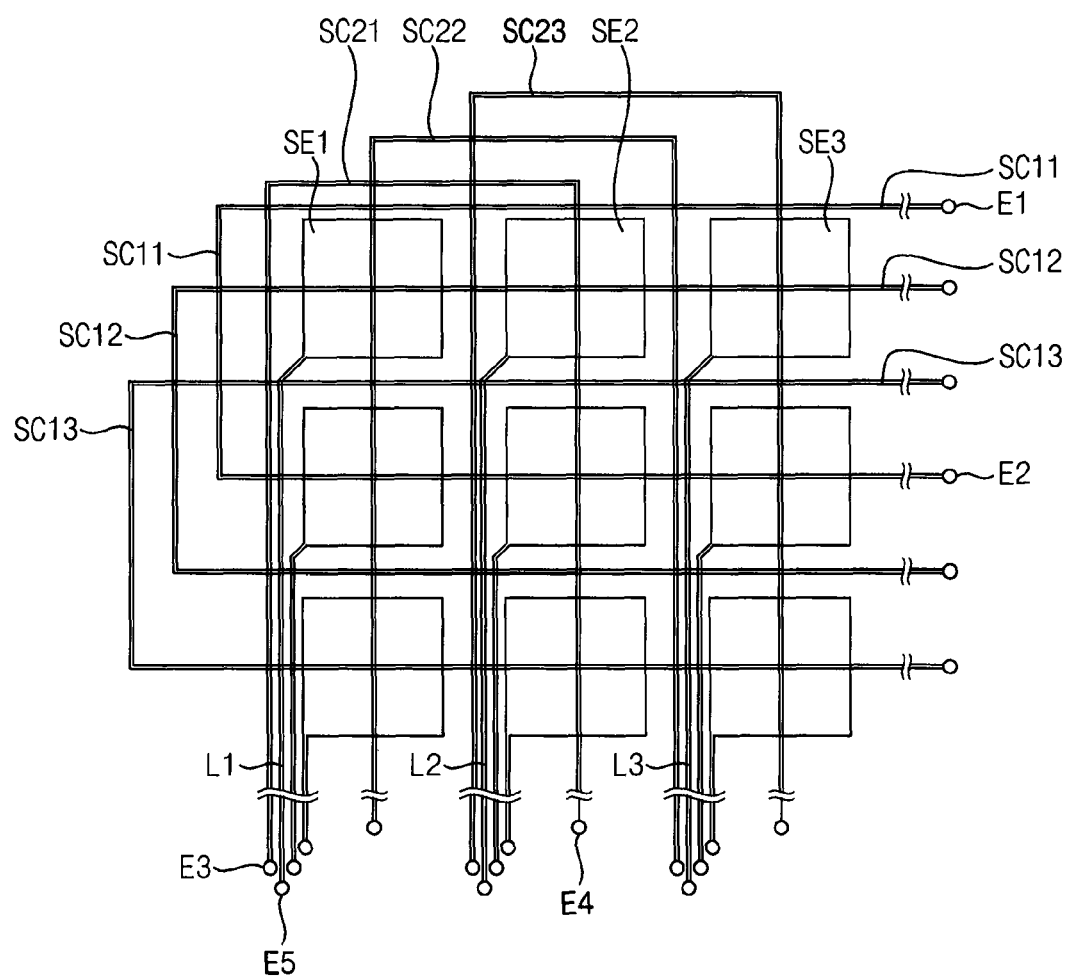
FIG. 2 is a conceptual diagram illustrating an operation of a touch sensor substrate of FIG. 1.

FIG. 2 is a conceptual diagram illustrating an operation of an embodiment of the touch sensor substrate 300.

Referring to FIGS. 1 and 2, the touch sensor substrate 300 includes the first touch sensor part TS1 and the second touch sensor part TS2.

The first touch sensor part TS1 includes a plurality of first sensing circuits SC11, SC12 and SC13 and a plurality of second sensing circuits SC21, SC22 and SC23.

The first sensing circuits SC11, SC12 and SC13 extend in the first direction D1 and are arranged in the second direction D2. A first end portion E1 of the first sensing circuits SC11, SC12 and SC13 receives a driving signal and a second end portion E2 of the first sensing circuits SC11, SC12 and SC13 receives a ground signal. The first sensing circuits SC11, SC12 and SC13 have the closed-loop structure, respectively.

The second sensing circuits SC21, SC22 and SC23 extend in the second direction D2 and are arranged in the first direction D1. A first end portion E3 of the second sensing circuits SC21, SC22 and SC23 outputs a first sensing signal sensed in the electromagnetic induction mode, and a second end portion E4 of the second sensing circuits SC21, SC22 and SC23 receives the ground signal. The second sensing circuits SC21, SC22 and SC23 have the closed-loop structure, respectively.

The second touch sensor part TS2 includes a plurality of sensing electrodes SE1, SE2 and SE3 and a plurality of signal lines L1, L2 and L3 that is connected to the sensing electrodes SE1, SE2 and SE3.

Each of the sensing electrodes SE1, SE2 and SE3 has a capacitance.

A first end portion E5 of the signal lines L1, L2 and L3 is respectively connected to the sensing electrodes SE1, SE2 and SE3. The first end portion E5 of the signal lines L1, L2 and L3 receives a driving signal and outputs a second sensing signal sensed in the capacitance mode.

A method of driving the touch sensor substrate 300 is explained as the following.

During an active period in which the display panel 100 receives the gate signal and the data signal, the first touch sensor part TS1 of the electromagnetic induction mode is activated. During a blanking period during which the display panel 100 does not receive the gate signal and the data signal, the second touch sensor part TS2 that operates in the capacitance mode is activated.

During the active period, a first end portion of the first sensing circuits SC11, SC12 and SC13 in the first touch sensor part TS1 receives a driving signal, and a second end portion of the first sensing circuits SC11, SC12 and SC13 in the first touch sensor part TS1 receives a ground signal. The first sensing circuits SC11, SC12 and SC13 form a current loop, respectively, and thus a magnetic field is formed. When the first input member 410 is disposed adjacent to the first sensing circuits SC11, SC12 and SC13, the magnetic field formed by the first sensing circuits SC11, SC12 and SC13 resonates with the resonance circuit in the first input member 410. Thus, the first input member 410 generates a resonant frequency.

The second sensing circuits SC21, SC22 and SC23 of the first touch sensor part TS1 receives the resonant frequency generated from the first input member 410. The first end portion of the second sensing circuits SC21, SC22 and SC23 receives a first sensing signal generated by the resonant frequency and a second end portion of the second sensing circuits SC21, SC22 and SC23 receives the ground signal.

Thus, a touch position of the first input member 410 may be detected based on the first sensing signal.

Then, during the blanking period, the sensing electrodes SE1, SE2 and SE3 of the second touch sensor part TS2 detect a touch position of the second input member 420.

The sensing electrodes SE1, SE2 and SE3 sequentially receive the driving signal through the signal lines L1, L2 and L3, and output the second sensing signal generated based on a touch of the second input member 420 through the signal lines L1, L2 and L3. When the second input member 420 touches the sensing electrode in a state when a predetermined current is applied to the sensing electrode, the sensing electrode generates a second sensing signal corresponding to a changing current of the sensing electrode.

For example, a first sensing electrode SE1 receives a driving signal through a first signal line L1 and outputs the second sensing signal that is a current change amount of the first sensing electrode SE1 corresponding to the touch of the second input member 420 through the first signal line L1. Then, a second sensing electrode SE2 receives the driving signal through a second signal line L2 and outputs the second sensing signal that is a current change amount of the second sensing electrode SE2 corresponding to the touch of the second input member 420 through the second signal line L2. As described above, a plurality of sensing electrodes of the touch sensor substrate 300 sequentially outputs the second sensing signal.

Thus, a touch position of the second input member 420 may be detected based on the second sensing signal.

Figure 3A:
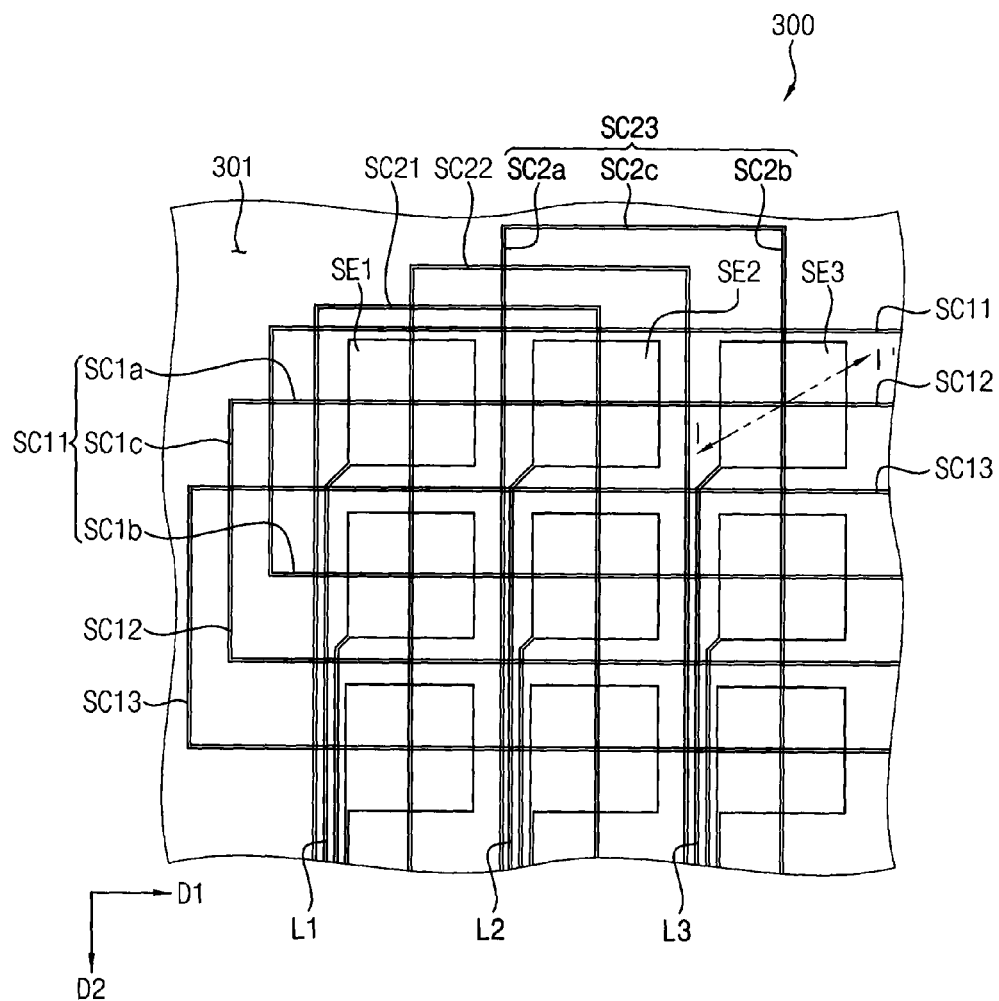
FIG. 3A is a plan view illustrating the touch sensor substrate of FIG. 1.
Figure 3B:
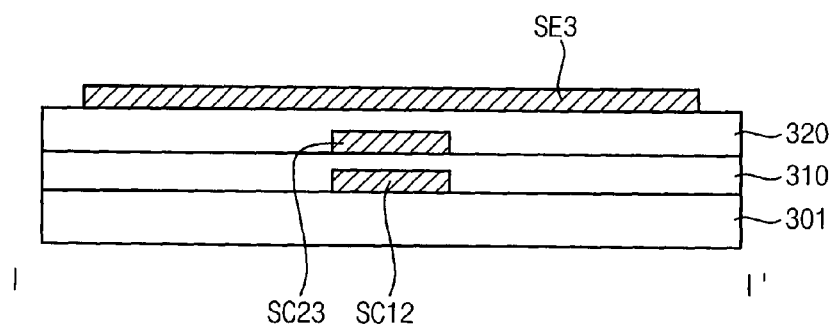
FIG. 3B is a cross-sectional view of the touch sensor substrate taken along the line I-I' in FIG. 3A.

FIG. 3A is a plan view illustrating the touch sensor substrate of FIG. 1. FIG. 3B is a cross-sectional view of the touch sensor substrate taken along the line I-I' in FIG. 3A.

Referring to FIGS. 1, 3A and 3B, the touch sensor substrate 300 includes a base substrate 301, a first touch sensor part TS1 and a second touch sensor part TS2.

The base substrate 301 may be a flexible circuit board.

The first touch sensor part TS1 is disposed on the base substrate 301 and includes a plurality of first sensing circuits SC11, SC12 and SC13 and a plurality of second sensing circuits SC21, SC22 and SC23.

The first sensing circuits SC11, SC12 and SC13 is formed from a metal layer and disposed on the base substrate 301.

Each of the first sensing circuits SC11, SC12 and SC13 includes a first sensing line SC1$a$, a second sensing line SC1$b$ and a third sensing line SC1$c$.

The first sensing line SC1$a$ extend in the first direction D1. The second sensing line SC1$b$ is spaced apart from the first sensing line SC1$a$ and extends in the first direction D1.

One of the first and second sensing lines SC1$a$ and SC1$b$ may overlap with the sensing electrodes of the second touch sensor part TS2 which are arranged in the first direction D1. As shown in FIG. 3A, the first sensing line SC1$a$ does not overlap with the sensing electrodes arranged in the first direction D1 and the second sensing line SC1$b$ overlaps with the sensing electrodes arranged in the first direction D1.

The third line SC1$c$ extends in the second direction D2 and is connected to first end portions of the first and second sensing lines SC1$a$ and SC1$b$.

The first and second sensing lines SC1$a$ and SC1$b$ may be disposed in a sensing area of the touch sensor substrate 300 and the third sensing line SC1$c$ may be disposed in a non-sensing area of the touch sensor substrate 300. The sensing area may correspond to a display area of the display panel 100 which displays an image.

A first insulating layer 310 is formed on the base substrate 301 on which the first sensing circuits SC11, SC12 and SC13 are formed.

The second sensing circuits SC21, SC22 and SC23 are formed from the metal layer and is formed on the base substrate 301 on which the first insulating layer 310 is formed.

Each of the second sensing circuits SC21, SC22 and SC23 includes a fourth sensing line SC2a, a fifth sensing line SC2b and a sixth sensing line SC2c.

The fourth sensing line SC2a extends in the second direction D2. The fifth sensing line SC2b is spaced apart from the fourth sensing line SC2a and extends in the second direction D2.

One of the fourth and fifth sensing lines SC2a and SC2b may overlap with the sensing electrodes of the second touch sensor part TS2 arranged in the second direction D2. As shown in FIG. 3A, the fourth sensing line SC2a does not overlap with the sensing electrodes arranged in the second direction D2 and the fifth sensing line SC2b overlaps with the sensing electrodes arranged in the second direction D2.

The sixth sensing line SC2c extends in the first direction D1 and is connected to first end portions of the fourth and fifth sensing lines SC2a and SC2b.

The fourth and fifth sensing lines SC2a and SC2b may be disposed in a sensing area of the touch sensor substrate 300 and the sixth sensing line SC2c may be disposed in non-sensing area of the touch sensor substrate 300.

A second insulating layer 320 is formed on the base substrate 301 on which the second sensing circuits SC21, SC22 and SC23 are formed.

The sensing electrodes SE1, SE2 and SE3 of the second touch sensor part TS2 and the signal lines L1, L2 and L3 are formed from the metal layer and are formed on the base substrate 301 on which the second insulating layer 320 is formed. Each of the signal lines L1, L2 and L3 is formed from the same line as that of the sensing electrodes SE1, SE2 and SE3. Thus, each of the signal lines L1, L2 and L3 extends from a corresponding one of the sensing electrodes SE1, SE2 and SE3.

The sensing electrodes of the second touch sensor part TS2 may be disposed in the sensing area of the touch sensor substrate 300 and may be arranged in the matrix configuration. Each of the sensing electrodes may have any of the various shapes such as a square, a rectangle, a diamond and so on. In addition, each of the sensing electrodes may have a size equal to at least one pixel P.

As described above, the first touch sensor part TS1 and the second touch sensor part TS2 may be formed on a same base substrate 301.

Alternatively, according to an exemplary embodiment, the second touch sensor part TS2 may be formed on the base substrate 301 firstland then the first touch sensor part TS1 is formed on the base substrate 301 on which the second touch sensor part TS2 is formed.

Figure 4A:
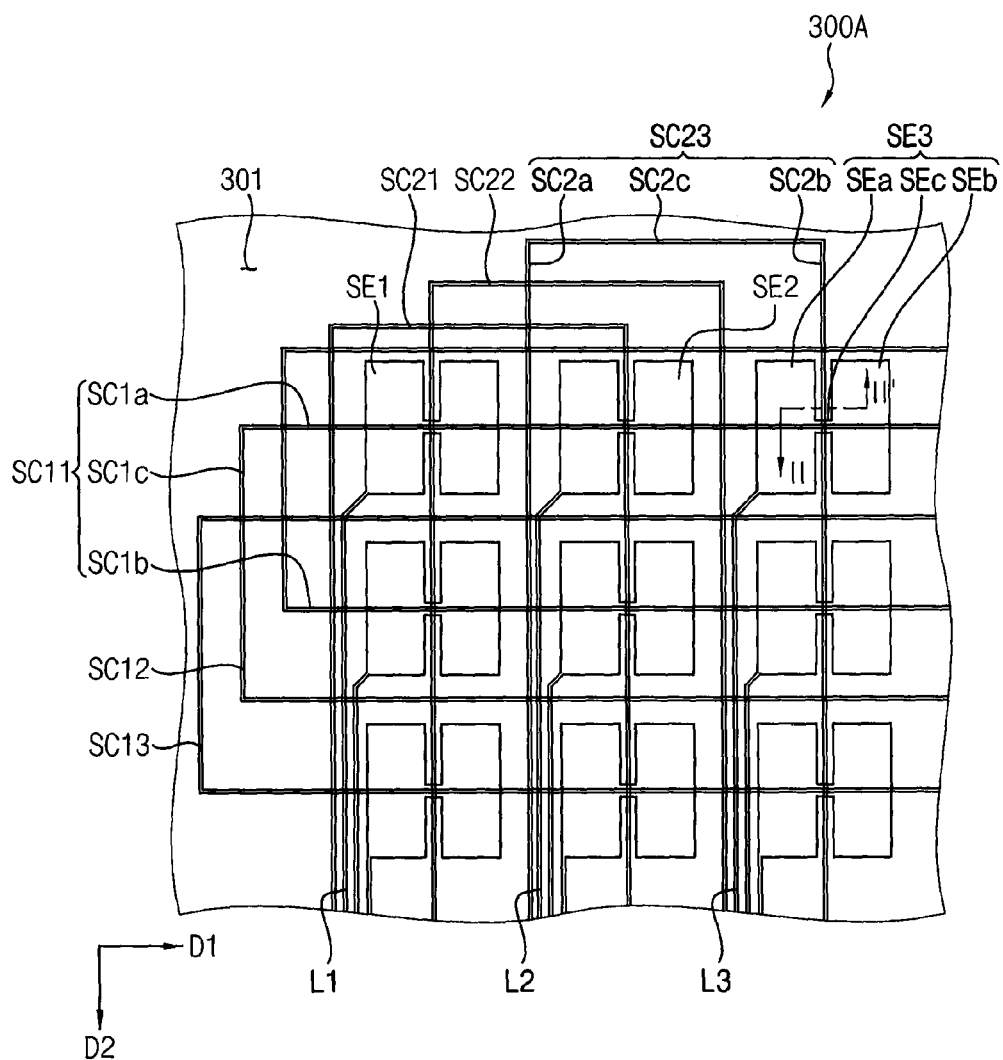
FIG. 4A is a plan view illustrating a touch sensor substrate according to an exemplary embodiment.
Figure 4B:
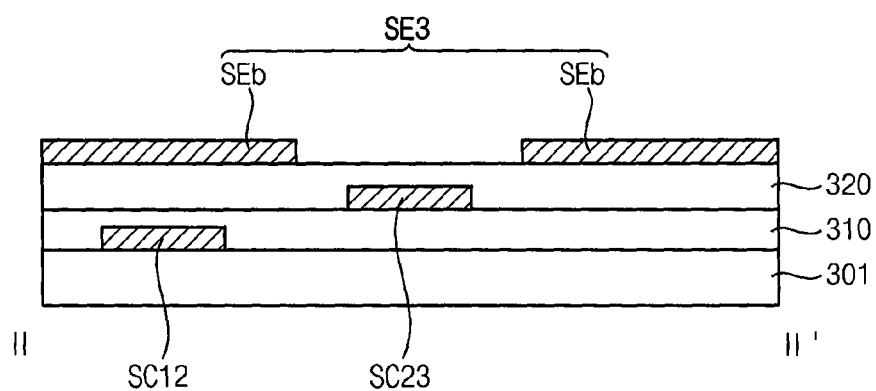
FIG. 4B is a cross-sectional view of the touch sensor substrate taken along the line II-I' in FIG. 4A.

FIG. 4A is a plan view illustrating a touch sensor substrate according to an exemplary embodiment. FIG. 4B is a cross-sectional view of the touch sensor substrate taken along the line II-IF in FIG. 4A. Hereinafter, the same reference numerals are used to refer to the same or like parts as those described in the previous exemplary embodiments, and the same detailed explanations are not repeated unless necessary.

Referring to FIGS. 1, 4A and 4B, the touch sensor substrate 300A includes a base substrate 301, a first touch sensor part TS1 and a second touch sensor part TS2.

The base substrate 301 may be a flexible circuit board.

The first touch sensor part TS1 is disposed on the base substrate 301 and includes a plurality of first sensing circuits SC11, SC12 and SC13 and a plurality of second sensing circuits SC21, SC22 and SC23.

The first sensing circuits SC11, SC12 and SC13 is formed from a metal layer and disposed on the base substrate 301. Each of the first sensing circuits SC11, SC12 and SC13 includes a first sensing line SC1a and a second sensing line SC1b which extend in the first direction D1 and a third sensing line SC1c which extends in the second direction D2.

A first insulating layer 310 is formed on the base substrate 301 on which the first sensing circuits SC11, SC12 and SC13 are formed.

The second sensing circuits SC21, SC22 and SC23 are formed from the metal layer and is formed on the base substrate 301 on which the first insulating layer 310 is formed. Each of the second sensing circuits SC21, SC22 and SC23 includes a fourth sensing line SC2a and a fifth sensing line SC2b which extend in the second direction D2 and a sixth sensing line SC2c which extend in the first direction D1.

A second insulating layer 320 is formed on the base substrate 301 on which the second sensing circuits SC21, SC22 and SC23 are formed.

The sensing electrodes SE1, SE2 and SE3 of the second touch sensor part TS2 and the signal lines L1, L2 and L3 are formed from the metal layer and are formed on the base substrate 301 on which the second insulating layer 320 is formed.

In an exemplary embodiment, each of the sensing electrodes SE1, SE2 and SE3 includes a first sub electrode SEa, a second sub electrode SEb and a connection electrode SEc.

The first sub electrode SEa is spaced apart from the fourth or fifth sensing line SC2a or SC2b extending in the second direction D2.

The second sub electrode SEb is spaced apart from the fourth or fifth sensing line SC2a or SC2b. The second sub electrode SEb is disposed on the other side of the fourth or fifth sensing line SC2a or SC2b from the first sub electrode Sea.

The connection electrode SEc extends in the first direction D1 and connects the first and second sub electrodes SEa and SEb. In the embodiment of FIG. 4A, the connection electrode SEc is narrower than the first and second sub electrodes SEa, SEb such that there is a space between the two sub electrodes SEa, SEb in some parts.

According to an exemplary embodiment, an overlap area in which the sensing electrode of the second touch sensor part TS2 overlaps with the first touch sensor part TS1 may be decreased compared with the previous exemplary embodiment referring to FIGS. 3A and 3B, thus decreasing parasitic capacitance.

Alternatively, the first and second sub electrodes of the sensing electrode may be spaced apart from the first or second sensing line SC1a or SC1b of the first sensing circuit extending in the first direction D1. In this case, the connection electrode may be connected to between the first and second sub electrodes extending in the second direction D2.

As described above, the first touch sensor part TS1 and the second touch sensor part TS2 may be formed on a same base substrate 301.

Alternatively, according to an exemplary embodiment, the second touch sensor part TS2 may be formed on the base substrate 301 first, and then the first touch sensor part TS1 is formed on the base substrate 301 on which the second touch sensor part TS2 is formed.

Figure 5A:
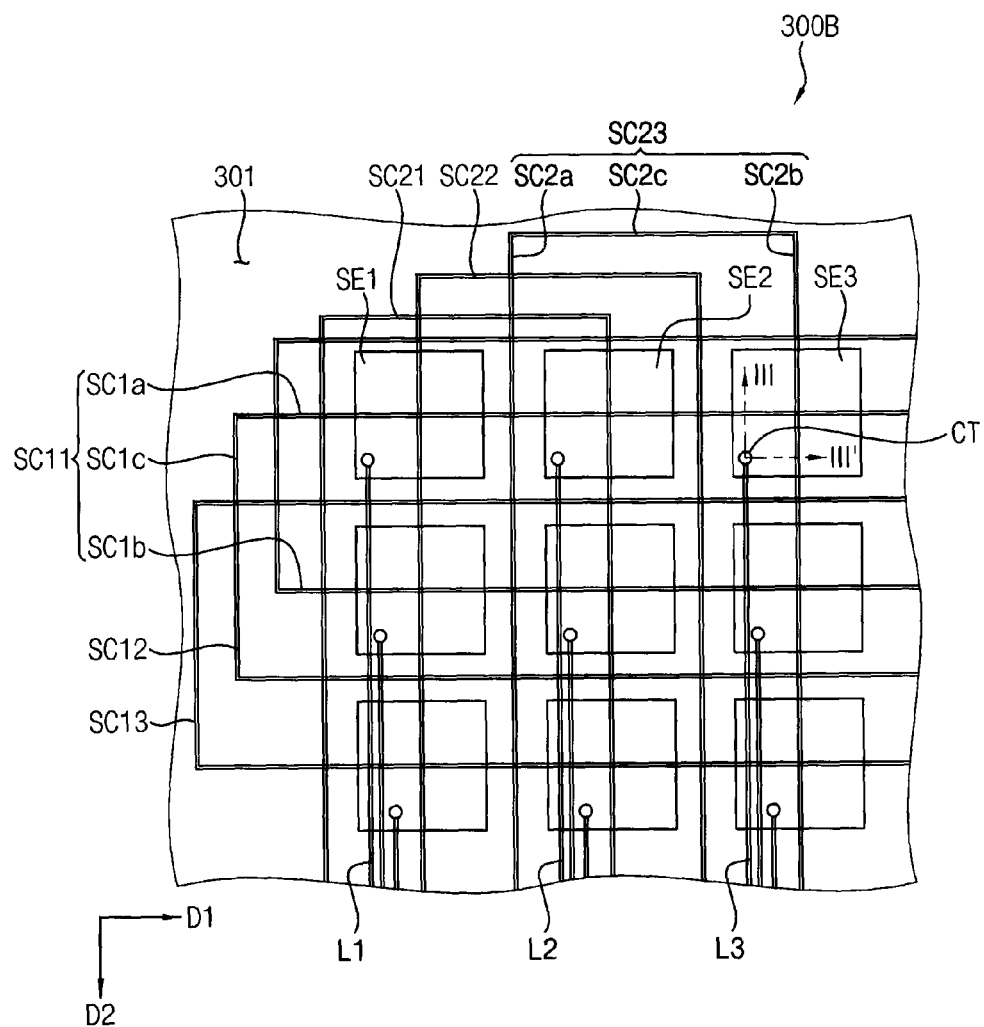
FIG. 5A is a plan view illustrating a touch sensor substrate according to an exemplary embodiment.
Figure 5B:
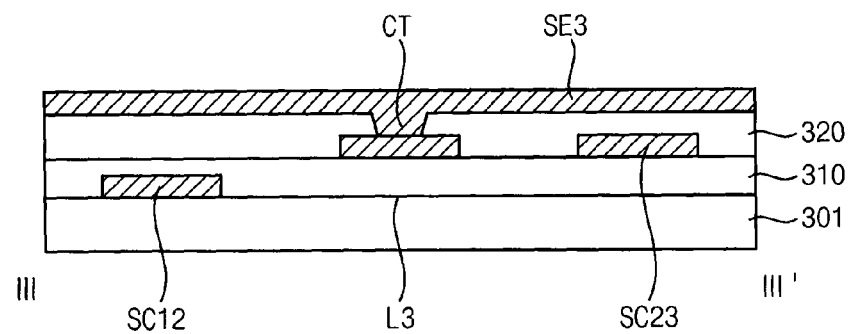
FIG. 5B is a cross-sectional view of the touch sensor substrate taken along the line in FIG. 5A.

FIG. 5A is a plan view illustrating a touch sensor substrate according to an exemplary embodiment. FIG. 5B is a cross-sectional view of the touch sensor substrate taken along the line III-III' in FIG. 5A. Hereinafter, the same reference numerals are used to refer to the same or like parts as those described in the previous exemplary embodiments, and the same detailed explanations are not repeated unless necessary.

Referring to FIGS. 1, 5A and 5B, the touch sensor substrate 300B includes the base substrate 301, first touch sensor part TS1 and second touch sensor part TS2.

The base substrate 301 may be a flexible circuit board.

The first touch sensor part TS1 is disposed on the base substrate 301 and includes a plurality of first sensing circuits SC11, SC12 and SC13 and a plurality of second sensing circuits SC21, SC22 and SC23.

The first sensing circuits SC11, SC12 and SC13 are formed from a metal layer and disposed on the base substrate 301. Each of the first sensing circuits SC11, SC12 and SC13 includes a first sensing line SC1a and a second sensing line SC1b that extend in the first direction D1 and a third sensing line SC1c that extends in the second direction D2.

A first insulating layer 310 is formed on the base substrate 301 on which the first sensing circuits SC11, SC12 and SC13 are formed.

The second sensing circuits SC21, SC22 and SC23 are formed from a metal layer on the first insulating layer 310. Each of the second sensing circuits SC21, SC22 and SC23 includes a fourth sensing line SC2a and a fifth sensing line SC2b which extend in the second direction D2 and a sixth sensing line SC2c which extend in the first direction D1.

In an exemplary embodiment, the signal lines L1, L2 and L3 of the second touch sensor part TS2 are formed from the same metal as that of the second sensing circuits SC21, SC22 and SC23 formed on the first insulating layer 310.

The signal lines L1, L2 and L3 extend in the second direction D2.

A second insulating layer 320 is formed on the base substrate 301 on which the second sensing circuits SC21, SC22 and SC23 and the signal lines L1, L2 and L3 are formed.

According to an exemplary embodiment, a plurality of contact holes CT is formed in the second insulating layer 320 and exposes the signal lines L1, L2 and L3.

The sensing electrodes SE1, SE2 and SE3 of the second touch sensor part TS2 are formed on the second insulating layer 320 including the contact holes CT using a metal layer. The sensing electrodes SE1, SE2 and SE3 are formed from the metal layer different from that of the signal lines L1, L2 and L3.

The sensing electrodes SE1, SE2 and SE3 are respectively connected to the signal lines L1, L2 and L3 through the contact holes CT.

According to an exemplary embodiment, a dead zone of the sensing area by the signal lines L1, L2 and L3 may be decreased compared with the exemplary embodiment shown in FIGS. 3A and 3B.

As described above, the first touch sensor part TS1 and the second touch sensor part TS2 may be formed on a same base substrate 301.

Alternatively, according to an exemplary embodiment, the second touch sensor part TS2 may be formed on the base substrate 301 first and then the first touch sensor part TS1 is formed on the base substrate 301 and the second touch sensor part TS2 is formed.

Figure 6:
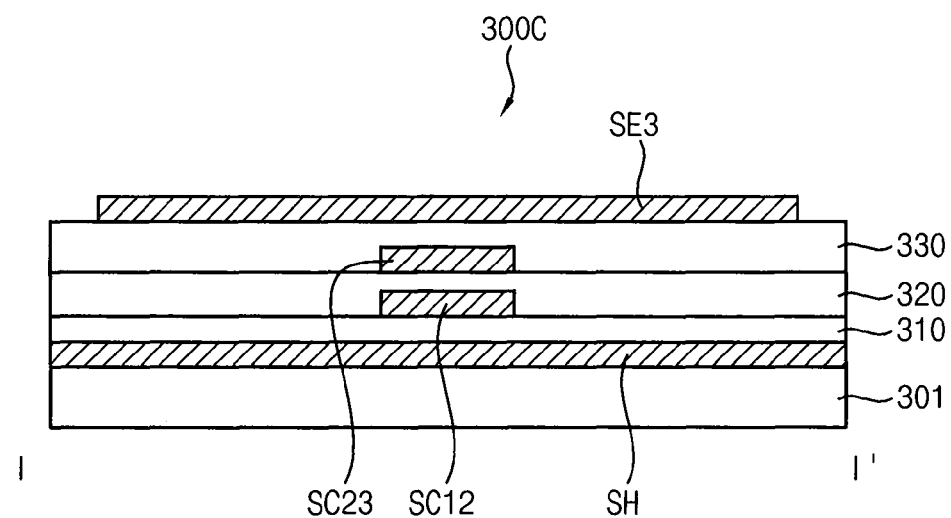
FIG. 6 is a cross-sectional view of a touch sensor substrate taken along the line I-I' in FIG. 3A according to an exemplary embodiment.

FIG. 6 is a cross-sectional view of a touch sensor substrate taken along the line I-I' in FIG. 3A according to an exemplary embodiment. Hereinafter, the same reference numerals are used to refer to the same or like parts as those described in the previous exemplary embodiments, and the same detailed explanations are not repeated unless necessary.

Referring to FIGS. 3A and 6, the touch sensor substrate 300C includes a base substrate 301, a blocking layer SH, a first touch sensor part TS1 and a second touch sensor part TS2.

The base substrate 301 may be a flexible circuit board.

The blocking layer SH is formed from a metal layer. The blocking layer SH blocks a magnetic field from leaking toward the rear surface of the base substrate 301 during the active period while the first touch sensor part TS1 may be driven. The blocking layer SH may be electrically floated during the active period and may receive the ground signal during the blanking period while the second touch sensor part TS2 is driven.

A first insulating layer 310 is disposed on the base substrate 301 on which the blocking layer SH is formed.

The first touch sensor part TS1 is disposed on the base substrate 301 on which the first insulating layer 310 is formed and includes a plurality of first sensing circuits SC11, SC12 and SC13 and a plurality of second sensing circuits SC21, SC22 and SC23.

The first sensing circuits SC11, SC12 and SC13 is formed from a metal layer and disposed on the base substrate 301 on which the first insulating layer 310 is formed. Each of the first sensing circuits SC11, SC12 and SC13 includes a first sensing line SC1a and a second sensing line SC1b which extend in the first direction D1, and a third sensing line SC1c which extends in the second direction D2.

A second insulating layer 320 is disposed on the base substrate 301 on which the first sensing circuits SC11, SC12 and SC13 are formed.

The second sensing circuits SC21, SC22 and SC23 are formed from a metal layer and are disposed on the base substrate 301 on which the second insulating layer 320 is formed. Each of the second sensing circuits SC21, SC22 and SC23 includes a fourth sensing line SC2a and a fifth sensing line SC2b which extend in the second direction D2 and a sixth sensing line SC2c which extends in the first direction D1.

A third insulating layer 330 is disposed on the base substrate 301 on which the second sensing circuits SC21, SC22 and SC23 are formed.

The second touch sensor part TS2 is disposed on the base substrate 301 on which the third insulating layer 330 is formed. The second touch sensor part TS2 includes a plurality of the sensing electrodes SE1, SE2 and SE3 and a plurality of signal lines L1, L2 and L3. The sensing electrodes SE1, SE2 and SE3 and the signal lines L1, L2 and L3 are formed from a same metal layer and are formed on the base substrate 301 on which the third insulating layer 330 is formed.

The first and second touch sensor parts TS1 and TS2 may be formed variously as previously exemplary embodiments referring to FIGS. 4A, 4B, 5A and 5B.

According to an exemplary embodiment, the touch sensor substrate 300C including the blocking layer SH may improve efficiency of the touch sensor in electromagnetic induction mode.

Figure 7:
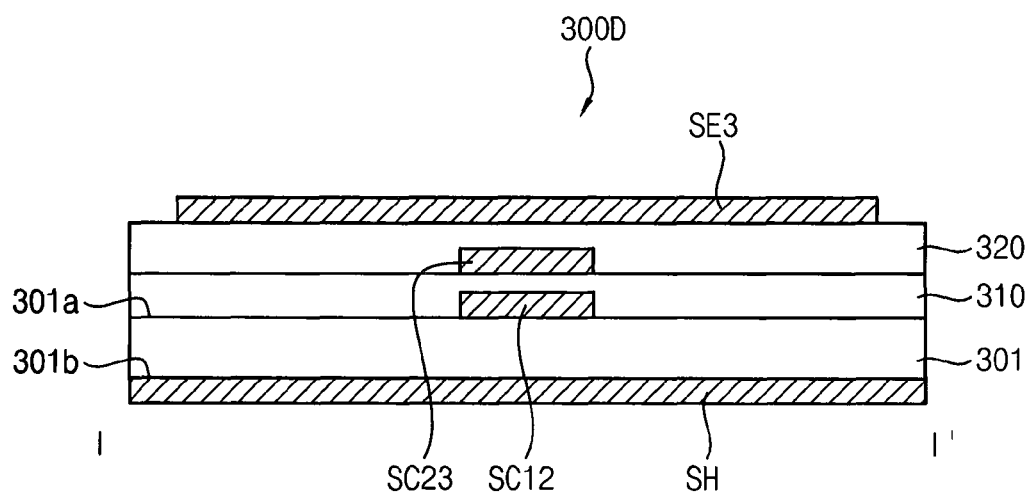
FIG. 7 is a cross-sectional view of a touch sensor substrate taken along the line I-I' in FIG. 3A according to an exemplary embodiment.

FIG. 7 is a cross-sectional view of a touch sensor substrate taken along the line I-I' in FIG. 3A according to an exemplary embodiment. Hereinafter, the same reference numerals are used to refer to the same or like parts as those described in the previous exemplary embodiments, and the same detailed explanations are not repeated unless necessary.

Referring to FIGS. 1, 3A and 7, the touch sensor substrate 300D includes a base substrate 301, a blocking layer SH, a first touch sensor part TS1 and a second touch sensor part TS2.

The base substrate 301 may be a flexible circuit board. The base substrate 301 includes a first surface 301a adjacent to the display panel 100 and a second surface 301b opposite to first surface 301a.

The blocking layer SH is disposed on the second surface 301b of the base substrate 301.

The blocking layer SH is formed from a metal layer. The blocking layer SH blocks a magnetic field from being leaked toward the second surface 301b of the base substrate 301 during the active period during which the first touch sensor part TS1 is driven. The blocking layer SH may be electrically floated during the active period and may receive the ground signal during the blanking period during which the second touch sensor part TS2 is driven.

The first touch sensor part TS1 is disposed on the first surface 301a of the base substrate 301 and includes a plurality of first sensing circuits SC11, SC12 and SC13 and a plurality of second sensing circuits SC21, SC22 and SC23.

The first sensing circuits SC11, SC12 and SC13 are formed from the metal layer and are disposed on the first surface 301a. Each of the first sensing circuits SC11, SC12 and SC13 includes a first sensing line SC1a and a second sensing line SC1b which extend in the first direction D1, and a third sensing line SC1c which extends in the second direction D2.

A first insulating layer 310 is disposed on the first surface 301a on which the first sensing circuits SC11, SC12 and SC13 are formed.

The second sensing circuits SC21, SC22 and SC23 are formed from the metal layer and are disposed on the first surface 301a on which the first insulating layer 310 is formed. Each of the second sensing circuits SC21, SC22 and SC23 includes a fourth sensing line SC2a and a fifth sensing line SC2b which extend in the second direction D2 and a sixth sensing line SC2c which extends in the first direction D1.

A second insulating layer 320 is disposed on the first surface 301a on which the second sensing circuits SC21, SC22 and SC23 are formed.

The second touch sensor part TS2 is disposed on the base substrate 301 on which the second insulating layer 320 is formed. The second touch sensor part TS2 includes a plurality of the sensing electrodes SE1, SE2 and SE3 and a plurality of signal lines L1, L2 and L3. The sensing electrodes SE1, SE2 and SE3 and the signal lines L1, L2 and L3 are formed from a same metal layer and are disposed on the first surface 301 on which the second insulating layer 320 is formed.

The first and second touch sensor parts TS1 and TS2 may be formed with variations as exemplary embodiments referring to FIGS. 4A, 4B, 5A and 5B.

According to an exemplary embodiment, the touch sensor substrate 300C including the blocking layer SH may improve efficiency of the touch sensor in electromagnetic induction mode.

Figure 8:
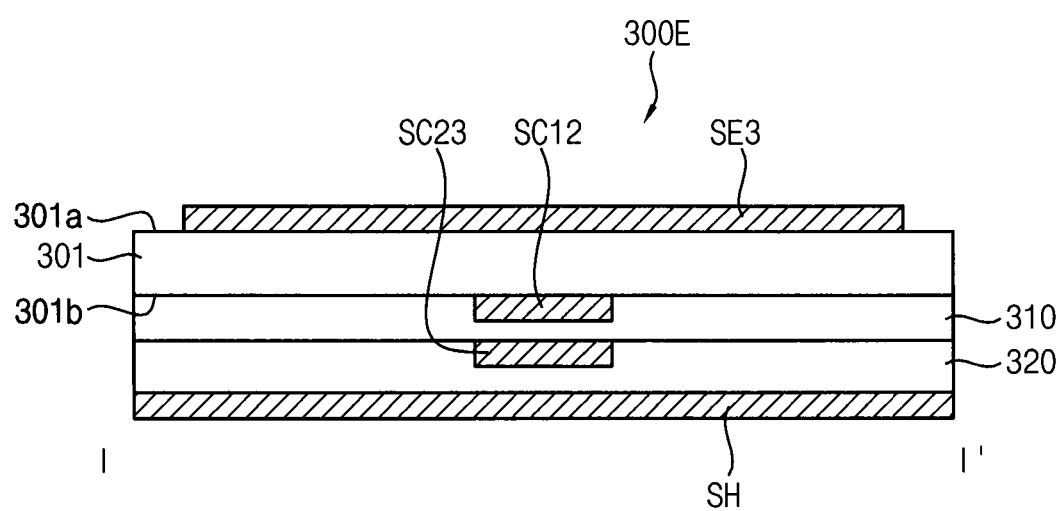
FIG. 8 is a cross-sectional view of a touch sensor substrate taken along the line I-I' in FIG. 3A according to an exemplary embodiment.

FIG. 8 is a cross-sectional view of a touch sensor substrate taken along the line I-I' in FIG. 3A according to an exemplary embodiment. Hereinafter, the same reference numerals are used to refer to the same or like parts as those described in the previous exemplary embodiments, and the same detailed explanations are not repeated unless necessary.

Referring to FIGS. 3A and 8, the touch sensor substrate 300E includes a base substrate 301, a blocking layer SH, a first touch sensor part TS1 and a second touch sensor part TS2.

The base substrate 301 may be a flexible circuit board. The base substrate 301 includes a first surface 301a adjacent to the display panel 100 and a second surface 301b opposite the first surface 301a.

The second touch sensor part TS2 is disposed on the first surface 301a and includes a plurality of sensing electrodes SE1, SE2 and SE3 and a plurality of signal lines L1, L2 and L3.

The sensing electrodes SE1, SE2 and SE3 and the signal lines L1, L2 and L3 are formed from a same metal layer and are disposed on the first surface 301a. Thus, each of the signal lines L1, L2 and L3 is a same metal pattern as each of the sensing electrodes SE1, SE2 and SE3. The signal lines L1, L2 and L3 extend from corresponding sensing electrodes SE1, SE2 and SE3, respectively.

The first touch sensor part TS1 is disposed on the second surface 301b and includes a plurality of first sensing circuits SC11, SC12 and SC13 and a plurality of second sensing circuits SC21, SC22 and SC23.

The first sensing circuits SC11, SC12 and SC13 are formed from the metal layer and are disposed on the second surface 301b. Each of the first sensing circuits SC11, SC12 and SC13 includes a first sensing line SC1a and a second sensing line SC1b which extend in the first direction D1, and a third sensing line SC1c which extend in the second direction D2.

A first insulating layer 310 is disposed on the second surface 301b on which the first sensing circuits SC11, SC12 and SC13 are formed.

The second sensing circuits SC21, SC22 and SC23 are formed from the metal layer and are disposed on the second surface 301b on which the first insulating layer 310 is formed. Each of the second sensing circuits SC21, SC22 and SC23 includes a fourth sensing line SC2a and a fifth sensing line SC2b which extend in the second direction D2 and a sixth sensing line SC2c which extends in the first direction D1.

A second insulating layer 320 is disposed on the second surface 301b on which the second sensing circuits SC21, SC22 and SC23 are formed.

The blocking layer SH is disposed on the second surface 301b on which the second insulating layer 320 is formed.

The blocking layer SH is formed from a metal layer. The blocking layer SH blocks a magnetic field from being leaked toward the second surface 301b of the base substrate 301 during the active period during which the first touch sensor part TS1 is driven. The blocking layer SH may be electrically floated during the active period and may receive the ground signal during the blanking period during which the second touch sensor part TS2 is driven.

According to an exemplary embodiment, the touch sensor substrate 300C including the blocking layer SH may improve efficiency of the touch sensor in electromagnetic induction mode.

According to exemplary embodiments of the inventive concept, a plurality of touch sensors which senses in modes different from each other may be formed on a same base substrate and thus the display apparatus may have a thin thickness. In addition, a single touch sensor substrate including the plurality of touch sensors is combined with the display panel, and thus an assembly of the display apparatus may be simplified.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A touch sensor substrate comprising:
   a base substrate;
   a first touch sensor part that is disposed on the base substrate and comprising a plurality of sensing circuits configured to sense a touch in an electromagnetic induction mode; and
   a second touch sensor part that is disposed on the base substrate, is electrically insulated from the first touch sensor part, and comprising a plurality of sensing electrodes configured to sense a touch in a self capacitance mode,
   wherein the first touch sensor part comprises a first sensing circuit including a first sensing line and a second sensing line that extend in the first direction, the first sensing line is disposed between two rows of adjacent sensing electrodes arranged in the first direction without overlapping with a sensing electrode, and the second sensing line overlaps with the sensing electrodes arranged in the first direction, and
   wherein the first touch sensor part further comprises a second sensing circuit including a fourth sensing line and a fifth sensing line that extend in the second direction, the fourth sensing line is disposed between two columns of adjacent sensing electrodes arranged in the second direction without overlapping with a sensing electrode, and the fifth sensing line overlaps with the sensing electrodes arranged in the second direction.

2. The touch sensor substrate of claim 1, wherein the second touch sensor part further comprises a plurality of signal lines connected to the sensing electrodes.

3. The touch sensor substrate of claim 2, wherein the signal lines extend from the sensing electrodes, respectively.

4. The touch sensor substrate of claim 2, further comprising:
   an insulating layer that is disposed between the signal lines and the sensing electrodes,
   wherein the signal lines are connected to the sensing electrodes through a plurality of contact holes formed in the insulating layer.

5. The touch sensor substrate of claim 1, wherein each of the first and second sensing circuits has a closed-loop structure.

6. The touch sensor substrate of claim 1, wherein the second sensing line and the fifth sensing line overlap with each other at a center portion of a sensing electrode.

7. The touch sensor substrate of claim 1, wherein each of the sensing electrodes comprises a first sub electrode, a second sub electrode being spaced apart from the first sub electrode and a connection electrode connecting the first and second sub electrodes, and the first touch sensor part is disposed in a spacing area between the first and second sub electrodes.

8. The touch sensor substrate of claim 1, further comprising:
   a blocking layer that blocks a magnetic field formed by the first touch sensor part from being leaked.

9. The touch sensor substrate of claim 8, wherein the blocking layer is disposed on the base substrate and the first and second touch sensor parts are disposed on the blocking layer.

10. The touch sensor substrate of claim 8, wherein the base substrate comprises a first surface and a second surface opposite the first surface,
    the first and second touch sensor parts are disposed on the first surface, and the blocking layer is disposed on the second surface.

11. A display apparatus comprising:
    a display panel that comprises a plurality of pixel transistors and a plurality of display elements driven by the plurality of pixel transistors;
    a cover member that is disposed on a first surface of the display panel configured to display an image using the plurality of display elements;
    a touch sensor substrate that is disposed adjacent to a second surface opposite to the first surface of the display panel, and comprises a base substrate, a first touch sensor part that is disposed on the base substrate and comprises a plurality of sensing circuits sensing a touch in an electromagnetic induction mode, and a second touch sensor part that is disposed on the base substrate, is electrically insulated from the first touch sensor part, and comprises a plurality of sensing electrodes sensing a touch in a self capacitance mode,
    wherein the first touch sensor part comprises a first sensing circuit including a first sensing line and a second sensing line that extend in the first direction, the first sensing line is disposed between two rows of adjacent sensing electrodes arranged in the first direction, and the second sensing line overlaps with the sensing electrodes arranged in the first direction, and
    wherein the first touch sensor part further comprises a second sensing circuit including a fourth sensing line and a fifth sensing line that extend in the second direction, the fourth sensing line is disposed between two columns of adjacent sensing electrodes arranged in the second direction, and the fifth sensing line overlaps with the sensing electrodes arranged in the second direction.

12. The display apparatus of claim 11, wherein the second touch sensor part further comprises a plurality of signal lines connected to the sensing electrodes.

13. The display apparatus of claim 12, wherein the signal lines extend from the sensing electrodes, respectively.

14. The display apparatus of claim 12, further comprising:
    an insulating layer that is disposed between the signal lines and the sensing electrodes,
    wherein the signal lines are connected to the sensing electrodes through a plurality of contact holes formed in the insulating layer.

15. The display apparatus of claim 11, wherein each of the first and second sensing circuits has a closed-loop structure.

16. The display apparatus of claim 11, wherein the second sensing line and the fifth sensing line overlap with each other at a center portion of a sensing electrode that are arranged in the second direction.

17. The display apparatus of claim 11, wherein each of the sensing electrodes comprises a first sub electrode, a second sub electrode being spaced apart from the first sub electrode and a connection electrode connecting the first and second sub electrodes, and
    the first touch sensor part is disposed in a spacing area between the first and second sub electrodes.

18. The display apparatus of claim 11, further comprising:
    a blocking layer that blocks a magnetic field formed by the first touch sensor part from being leaked.

19. The display apparatus of claim 18, wherein the blocking layer is disposed on the base substrate, and
    the first and second touch sensor parts are disposed on the blocking layer.

20. The display apparatus of claim 18, wherein the base substrate comprises a first surface and a second surface opposing the first surface, the first and second touch sensor parts are disposed on the first surface, and the blocking layer is disposed on the second surface.

* * * * *